May 9, 1961 W. T. FERGUSON ET AL 2,983,065
FISHING LURES
Filed June 29, 1959 3 Sheets-Sheet 1
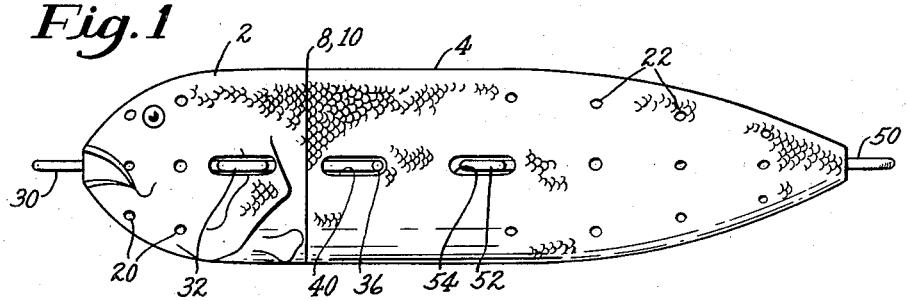
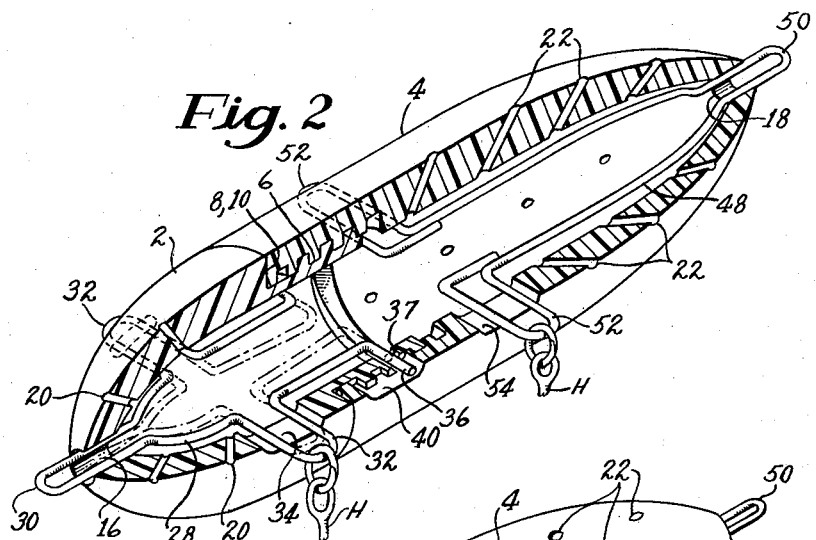
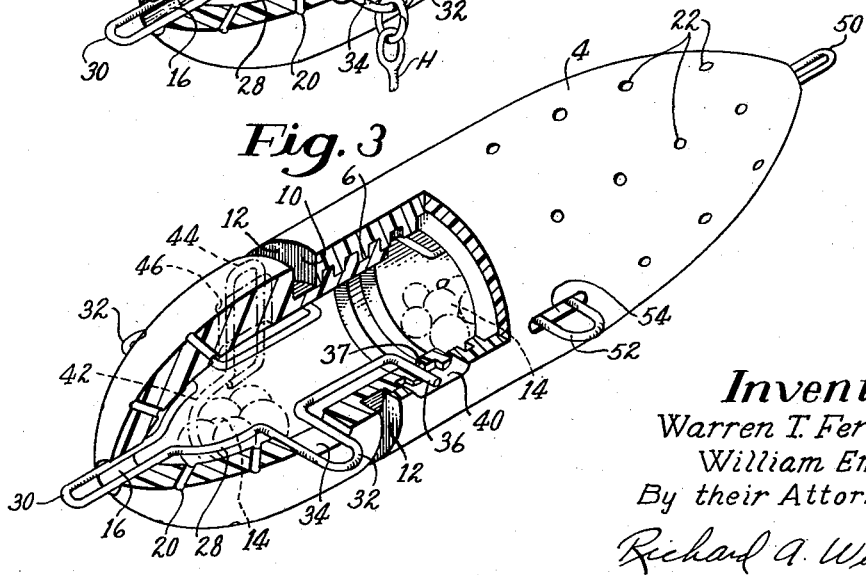
Inventors
Warren T. Ferguson
William Emerson
By their Attorney
Richard A. Wise May 9, 1961 W. T. FERGUSON ET AL 2,983,065
FISHING LURES
Filed June 29, 1959 3 Sheets-Sheet 2

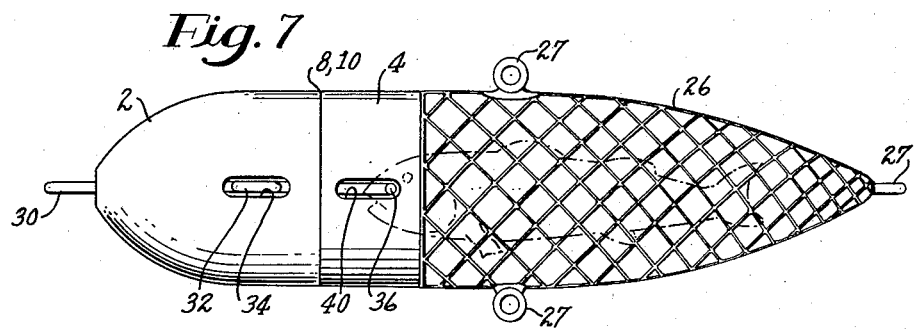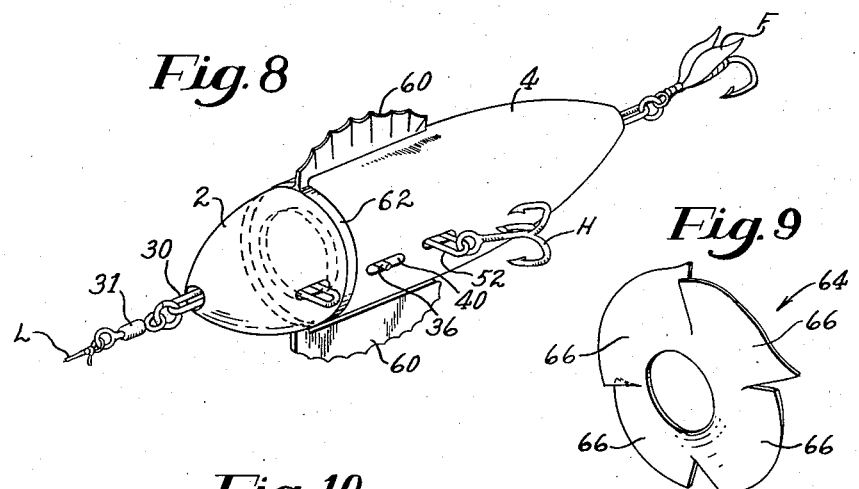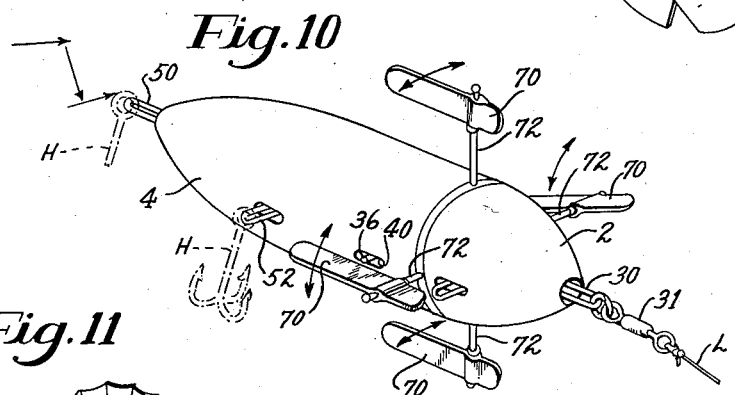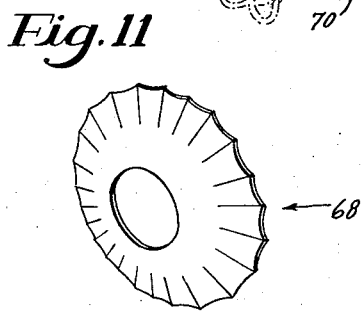

United States Patent Office 2,983,065
Patented May 9, 1961

2,983,065
FISHING LURES

Warren T. Ferguson, 16 Fairbanks Road, Lexington, Mass., and William Emerson, Newton, Mass. (68 Bourne St., Auburndale, Mass.)

Filed June 29, 1959, Ser. No. 823,660

13 Claims. (Cl. 43—42.09)

This invention relates to fishing lures and more particularly to hollow adjustable plugs which are adaptable to receive, interchangeably, a plurality of fish-attracting or fish-hooking accessories. The modern fisherman is overburdened with considerable amounts of tackle which must be, for the most part, carried to the fishing location. An obvious benefit results if the numerous individual pieces of tackle or equipment can be replaced with fewer, more versatile, pieces doing the same jobs. For example, if one piece of basis equipment, such as a plug, having a number of interchangeable pieces of accessory equipment each with a different use or purpose can replace a number of plugs each with but a single use, then a saving of space, weight and money results. It is to this ultimate aim that this invention is directed.

An object of this invention is to provide a plug which has readily accessible hook attaching members to vary the number of hooks carried by the plug in accordance with local fishing regulations.

It is another object to provide a hollow plug for scented or live baits with means to prevent the plug from coming apart during use.

Still another object is to provide a plug having means for firmly and adjustably clamping one or more of a selection of accessory pieces of equipment on it.

Still a further object of the invention is to provide a plug having efficient mechanism for accomplishing all of the foregoing objects with a minimum of parts which are simple to operate and inexpensive to manufacture.

In accordance with these objects and as a feature of this invention, there is provided a plug having a hollow nosepiece and a hollow body member joined together by an interlock, such as screw threads or the like. Both the nosepiece and the body members have shoulders formed on them which are in engagement when the threads are fully advanced and which define between them an annular groove in the plug when the nosepiece and body are partially unscrewed. Within the annular groove there is positioned one or more of a number of accessory devices including, but not limited to, deflecting fins for rotating the plug as it is drawn through the water, a curved disk for facilitating drawing the plug through weeds without fouling, hook attaching outrigger arms, motion controlling planes for imparting a dancing or wiggling motion to the plug or an eel skin rig, etc. The accessory members are secured generally to flat rings which fit within the groove and are clamped by the shoulders defining the groove. To prevent the plug from becoming unscrewed during use whether the accessory members are clamped in the groove or whether there are no accessory members and the body and nosepiece are threaded together with an uninterrupted surface, there is provided an easily operated pair of locking arms or spurs which prevent relative rotation of the nosepiece and body. The spurs are attached to a U-shaped spring member positioned within the plug and which has also located thereon hook attaching loops plus a loop for attachment to the line. The plug being hollow readily adapts itself to the use of bleeding or scented baits or to self-contained weights to control its buoyance. The plug is provided with appropriate holes to facilitate the flow of water through its interior when it is trolled or otherwise drawn through the water while containing scented bait.

The above and other features of the invention including various novel details of construction and combinations of parts will now be more particularly described with reference to the accompanying drawings and pointed out in the claims, but it will be understood that the examples given hereinafter are by way of illustration only and not as limitations of the invention.

In the drawings,

Fig. 1 is a side view of a two-part hollow plug embodying the invention;

Fig. 2 is a perspective view, partly broken away, of the plug shown in Fig. 1;

Fig. 3 is a perspective view, partly broken away and similar to Fig. 2, showing the plug in a different position of adjustment;

Fig. 7 is a side view of a plug provided with a wire mesh body useable with live bait;

Fig. 8 is a perspective view of a plug provided with accessory guiding fins;

Fig. 9 is a perspective view of an accessory in the form of a rotatable fish-attracting disk;

Fig. 10 is a perspective view of a plug having accessory guiding members arranged to impart irregular movement; and Fig. 11 is a perspective view similar to Fig. 9 of an accessory weed deflecting member.

Figure 4:
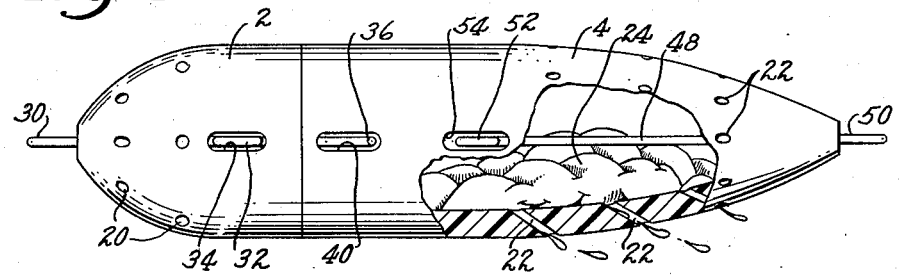
Fig. 4 is a side view, partly broken away, of a plug similar to that shown in Fig. 1 and containing a scented bait.

Referring particularly to Figs. 1 and 3, the invention will be seen embodied in a two-part hollow plug having a nosepiece 2 and a body portion 4 of a lightweight material, preferably, but not necessarily, buoyant plastic which, when sold, may be either painted or unpainted. The plug may also be made of wood, metal, or any other desirable material and, if unpainted when purchased, the plug could be decorated by the fisherman in accordance with the particular usage to which it will be made. For example, it may be painted to represent a fish, as shown in Fig. 1, which is quite common, or otherwise made luminous which has met with recent success in tropical waters. The nosepiece and body are secured together by screw threads 6, the nosepiece being the inner member and having external threads meshing with the internally threaded body portion which is actually the outer threaded member. A shoulder 8 (Fig. 3) on the nosepiece engages a mating shoulder 10 on the body portion when the threads 6 are fully advanced relatively to each other and thereby form a continuous, uninterrupted outer surface on the plug, as seen in Figs. 1 and 2. However, when the threads are not fully advanced, i.e. the members partially unscrewed as shown in Fig. 3, there is formed an annular groove 12 between the body and the nosepiece which is defined lengthwise of the plug by the shoulders 8 and 10. This groove and its purpose will be described in more detail hereinafter.

The plug, if made of buoyant material, will naturally float, but being hollow, may be filled with weights such as lead shot 14 (Fig. 3) of any desired amount. This not only provides a plug which may be made to behave or react to trolling or casting in various ways in different locations or water conditions but is readily adaptable to practice casting with or without hooks as will become more apparent hereinafter.

At the ends of the nosepiece 2 and the body 4, the plug is axially bored as at 16 and 18, respectively, which, among other things, permits a free flow of water through the plug. Also formed in the nosepiece are a plurality of bores 20 communicating with its hollow interior. The bores 20 are formed preferably at varying acute angles with the axis of the plug as shown in Figs. 2 and 3, bu may also be formed normal thereto. When formed as shown, a greater flow of water into the plug will occur when it is trolled or otherwise drawn through the water. Corresponding to the bores 20, in the nosepiece but at complementary angles, are bores 22 in the body. A major purpose of the plug being hollow, in addition to accepting weights, is to receive a scented or bleeding bait such as pig's liver shown at 24 in Fig. 4. A bleeding bait, such as this, is most advantageously used with this plug since the blood scented water will be conducted out of the plug by way of the bores 22.

It is within the scope of this invention to make the hollow body portion 4 of the plug of a relatively open screen or wire material, such as a mesh cage 26 shown in Fig. 7, thereby to accommodate a live bait. Hooks would be attached to rings 27 on the cage. The advantage of a live bait is lost if it is materially enclosed or confined. However, the mesh cage 26 not only permits the bait to be seen and smelled but wiggling motions of the bait are imparted to the plug. Furthermore, the bait, not being hooked, will live indefinitely and may be reused. Another advantage of the mesh cage body portion, or for that matter, an entire plug made of mesh material is that it is impossible for the bait to escape from the plug. In many states the use of live bait in reclaimed and restocked ponds and lakes is prohibited for the reason that if a live bait escapes from the fisherman's hook it could live and reproduce a species of fish undesirable to the pond. However, since the bait cannot escape even if the entire plug were lost, it could not contaminate the ponds with undesirable species. The number of different baits that may be used in a plug that is hollow and has a free flow of water through it is almost limitless and only governed by the fish and game laws of the locale and the circumstances under which the plug is used.

As seen in Figs. 2 and 3, a flexible spring wire or rod 28, generally of U-shaped configuration, is fitted in the nosepiece 2 of the plug. Intermediate its ends, the spring wire is bent into a small U-shaped projection 30 which extends through the axial bore 16 to form a hook or loop. To this loop 30 there may be attached the fish line either directly or by a swivel 31, as shown in Figs. 8 and 10. Between the projecting portion or loop 30 and its ends the spring wire 28 also bent into small U-shaped loops 32 which project outwardly through apertures 34 in the wall of the nosepiece. Hooks H may be attached to the loops 32, as shown in Fig. 2. The spring wire 28 terminates in short spurs or arms 36 which project through apertures 37 in the externally threaded portion of the nosepiece 2 (Figs. 2, 3 and 5) which is also known as the inner threaded member and into a slot or elongated hole 40 in the internally threaded portion of the body 4 which is the outer threaded member. The arms 36 lock the nosepiece and body together in any position of adjustment and prevent these members from inadvertently separating. As long as the arms or spurs 36 project into the slots 40, the nosepiece and body cannot be rotated relatively to each other. However, by squeezing the projections or loops 32 inwardly of the plug, the arms or spurs 36 are withdrawn from the slots 40 passing freely through the apertures 37 in the nosepiece 2 whereupon the nosepiece and body may be rotated. In this process the spring wire 28 assumes the dotted line position shown in Fig. 2. When the threads 6 are fully advanced and the shoulders 8 and 10 are in contact so that there is no annular groove 12 between the nosepiece and the body, the arms will be located at the rearward end of the slots 40.

By withdrawing the spurs 36 from the slots 40 and unscrewing the body and nosepiece, at every one-half rotation, each spur can enter the alternate slot 40 to lock the members together with the annular groove 12 becoming correspondingly larger, the only difference being that the spurs 36 progressively move with each complete rotation or part thereof toward the front or left-hand end of the slot as seen in Figs. 2 and 3.

It will be understood that the above described member 28 may be located either in the nosepiece 2 or the body 4 and that it is immaterial whether or not the internal threads are on the body or the nosepiece. It will likewise be apparent that the member 28 serves a number of purposes, i.e. it provides means for attaching the plug to the line, it provides hook-attaching loops, it provides means for releasably locking the nosepiece and body together to prevent their coming apart, and also controls the width of the annular groove 12.

It is obvious that the member 28 may, without departing from the spirit of this invention, be made of flat spring steel or other resilient material of appropriate shape and the loops 30 and 32 and the spurs 36 soldered or welded to it as well as being integral with it as they are when the member 28 is made of wire. The latter was selected for the illustrative example because of its simplicity, low cost and ease of manufacture.

If it is desired to add more hooks to the plug, an additional spring wire 42 (Fig. 3) may be employed. The wire is bent in the form of loops 44, as shown, which project through slots 46 in the nosepiece (only one of which is shown) at right angles to the loops or projections 32 or may be positioned at any other convenient location. This spring wire 42 need not have a line-attaching loop or projection corresponding to the projection 30 nor need it be provided with locking arms or spurs 36.

Referring also to Fig. 2, a hook-attaching spring wire 48 similar to wire 42 in the nosepiece 2 is shown in the body portion 4 and has a U-shaped bend or loop 50 projecting from the bore 18 and has hook-attaching bends in the form of closed loops 52 projecting outwardly of the body through slots 54. A hook H (Fig. 10) or a fly F (Fig. 8) or other fish attracting or catching devices may be attached to the projection 50. More than one hook-attaching spring wire may be employed in the body portion as well as in the nosepiece. As stated above, if desired, the spring wire within the body portion could be formed with the locking arms or spurs 36 on it and will function in the same manner as the spring wire 28 of the nosepiece.

The purpose of the annular groove 12 formed between the nosepiece 2 and the body 4 by their respective shoulders 8 and 10, is to accommodate either loosely or snugly held accessory equipment on the plug. In Fig. 8 there will be seen a pair of fins 60 secured to an annular ring 62 which is firmly clamped in the groove 12 between the shoulders 8 and 10 on the body and the nosepiece, respectively. To impart rotary motion to the plug when it is pulled through the water, the fins would be deflected at angles to the axis of the plug and a swivel 31 would be used on the line L. A single fin without axial deflection would act as a keel serving to maintain the plug upright. Furthermore, one or more fins could be used as sinking weights, if desired.

Fig. 9 shows a rotatable curved disk 64 having blades 66 appropriately deflected to impart a rotary motion to the entire disk when the plug is pulled through the water. When so used, the disk must be free to rotate in the groove 12. Accordingly, the nosepiece would not be advanced to clamp the disk against the body but would be locked in position to permit a loose fit between the disk and the groove. If desired, the disk 64 may be clamped securely between the nosepiece and body to cause the entire plug to rotate when pulled through the water.

A similar curved disk 68 is shown in Fig. 11 and is intended as a weed deflector which may be either scalloped at its periphery, as shown, or smooth. In use, it is either firmly clamped or loosely positioned between the nosepiece 2 and the body 4.

Fig. 10 shows a dancing or wiggling plug having a plurality of control planes 70 each pressed onto a radially projecting arm 72 which are secured to a ring 74 clamped in the groove 12. The planes may be adjusted on the arms as desired to give a dancing or irregular wiggling motion to the plug as it is drawn through the water.

Figure 5:
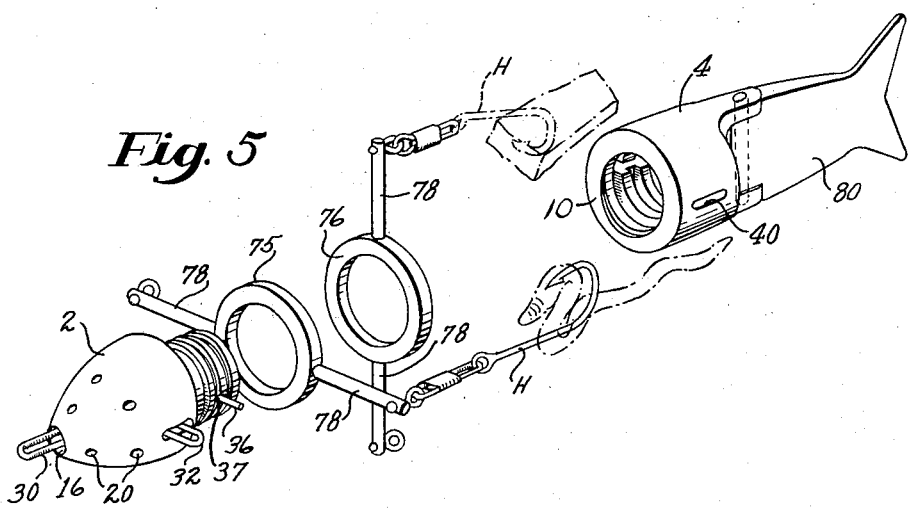
Fig. 5 is an exploded view of a plug embodying the invention and having accessory hook mounting members.

Fig. 5 which is an exploded view of a plug embodying the invention, shows a pair of rings 75, 76 each having outrigger arms 78 to which hooks H are attached. The rings may be used singly or, if used together, the angular relationship between the outrigger arms 78 may be varied as for example, either at right angles, as shown in Fig. 5, or at any other desired relationship. The body portion 4 of the plug may be provided with a swivel tail 80 which may be used in combination with any of the accessories disclosed.

Figure 6:
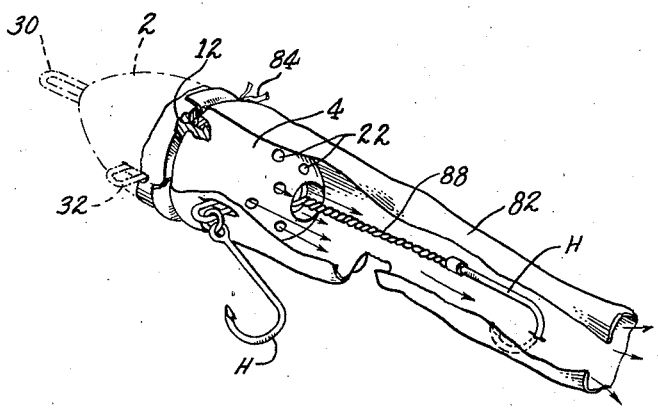
Fig. 6 is a perspective view of a plug embodying the invention and provided with an "eel skin" rig.

Fig. 6 shows a plug having a somewhat foreshortened body 4 mounting the popular "eel skin" rig. The skin 82 is secured by an appropriate binding, such as a resilient band or wire 84, in the annular groove 12. The body has a somewhat enlarged axial bore 86 through which the hook leader 88 projects. The leader may be attached to the end of a spring wire positioned within the body in the manner described above. The water outlet holes 22 in this case will be positioned closer to the axial bore 86 and inwardly of the skin 82 to inflate the skin in realistic manner.

It will be apparent that our novel fishing lure may be used in various ways with combinations of accessory equipment similar to the types described above without departing from the scope or spirit of this invention.

Having thus described our invention, what we claim as new and desire to secure by Letters Patent of the United States is:

1. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, a locking spur projecting out of the inner threaded member of the nosepiece and the body members and received in a slot parallel with the axis of the plug in the outer threaded member of the nosepiece and body members to prevent relative rotation thereof, and means for withdrawing the spur from the slot inwardly of the plug to permit relative rotation of the nosepiece and body members to vary the size of the annular groove.

2. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, a locking spur projecting out of the inner threaded member of the nosepiece and the body members and received in a slot parallel with the axis of the plug in the outer threaded member of the nosepiece and body members to prevent relative rotation thereof, and means for withdrawing the spur from the slot inwardly of the plug to permit relative rotation of the nosepiece and body members to vary the size of the annular groove, the spur being the end of a flexible spring wire positioned within the plug and having a U-shaped portion projecting from a bore located on the axis of the plug to which U-shaped portion a fastener may be attached.

3. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, a locking spur projecting out of the inner threaded member of the nosepiece and the body members and received in a slot parallel with the axis of the plug in the outer threaded member of the nosepiece and body members to prevent relative rotation thereof, an aperture in the inner threaded member through which the spur can freely pass, and means for withdrawing the spur from the slot inwardly of the plug to permit relative rotation of the nosepiece and body members to vary the size of the annular groove, the spur being the end of a flexible spring wire positioned within the plug and having a U-shaped portion projecting from a bore located on the axis of the plug to which U-shaped portion a fastener may be attached, a U-shaped projection formed on the spring wire and extending through an aperture in the side of the plug between the first-mentioned U-shaped portion and the spur whereby the spur may be withdrawn through said aperture in the inner threaded member from locking position by depressing said second-mentioned projection.

4. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, means for releasably locking the nosepiece and body members against relative rotation both when the screw threads are fully advanced and when partially unscrewed thereby accurately to control the size of the annular groove betwee nthe shoulders on the nosepiece and body members, the releasable locking means comprising a flexible spring wire positioned within the plug and having a pair of outwardly extending arms at the ends of the wire each projecting from the inner threaded member of the nosepiece and body and received in a slot in the outer threaded member of the nosepiece and body parallel with the axis of the plug to prevent relative rotation thereof, apertures in the inner threaded member through which the arms can freely pass, U-shaped loops in the wire projecting through the wall of the plug for the attachment of hooks or the like, said spring wire being resiliently urged outwardly at all times whereby when the loops are pressed inwardly of the plug the arms are withdrawn from the slots through said apertures to permit relative rotation of the nosepiece and body members to vary the size of the annular groove.

5. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, means for releasably locking the nosepiece and body members against relative rotation both when the screw threads are fully advanced and when partially unscrewed thereby accurately to control the size of the annular groove between the shoulders on the nosepiece and body members, the releasable locking means comprising a flexible spring wire positioned within the plug and having a pair of outwardly extending arms at the ends of the wire each projecting from the inner threaded member of the nosepiece and body members and received in a slot in the outer threaded member of the nosepiece and body members parallel with the axis of the plug to prevent relative rotation thereof, apertures in the inner threaded member through which the arms can freely pass, U-shaped loops in the wire projecting through the wall of the plug for the attachment of hooks or the like, said spring wire being resiliently urged outwardly at all times whereby when the loops are pressed inwardly of the plug the arms are withdrawn from the slots through said apertures to permit relative rotation of the nosepiece and body members to vary the size of the annular groove, a U-shaped loop in the wire between the first-mentioned loops and projecting through an aperture located on the axis of the plug for attaching the plug to the line.

6. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, means on one of said members engageable alternatively with a plurality of cooperating means on the other of said members for releasably locking the nosepiece and body members against relative rotation both when the screw threads are fully advanced and when partially unscrewed thereby accurately to control the size of the annular groove between the shoulders on the nosepiece and body members, at least one flexible spring wire within the plug having its ends formed into closed loops, the loops projecting from apertures in the wall of the plug for attaching hooks or the like to the plug.

7. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, means on one of said members engageable alternatively with a plurality of cooperating means on the other of said members for releasably locking the nosepiece and body members against relative rotation both when the screw threads are fully advanced and when partially unscrewed thereby accurately to control the size of the annular groove between the shoulders on the nosepiece and body members, at least one flexible spring wire within the plug having its ends formed into closed loops, the loops projecting from apertures in the wall of the plug for attaching hooks or the like to the plug, a U-shaped loop intermediate the first-mentioned loops and projecting through a hole in the rearward end of the plug for attaching hooks or the like to the plug.

8. A fishing lure comprising a two-part hollow plug having a nosepiece member and a body member having inner and outer members joined by screw threads, each of the nosepiece and the body members having a shoulder formed on it which shoulders are in engagement when the threads are fully advanced, and which define between them an annular groove in the plug when the nosepiece and body members are partially unscrewed, means on one of said members engageable alternatively with a plurality of cooperating means on the other of said members for releasably locking the nosepiece and body members against relative rotation both when the screw threads are fully advanced and when partially unscrewed thereby accurately to control the size of the annular groove between the shoulders on the nosepiece and body member, an annular ring removably inserted in the annular groove, and accessory fishing equipment secured directly to said ring.

9. The fishing lure of claim 8 in which the accessory equipment is a pair of deflecting fins for rotating the plug as it is drawn through the water.

10. The fishing lure of claim 8 in which the accessory equipment is an outwardly extending curved disk.

11. The fishing lure of claim 8 in which the accessory equipment are motion controlling planes adjustably attached to radial arms.

12. The fishing lure of claim 8 in which the accessory equipment is an eel skin rig.

13. The fishing lure of claim 8 in which the accessory equipment are hook-attaching outrigger arms.

References Cited in the file of this patent

UNITED STATES PATENTS

| Number | Name | Date |
|---|---|---|
| 2,112,385 | Smith | Mar. 29, 1938 |
| 2,167,334 | Hayes | July 25, 1939 |
| 2,545,398 | Warobiew | Mar. 13, 1951 |
| 2,563,282 | Schenck | Aug. 7, 1951 |
| 2,573,399 | Cannon | Oct. 30, 1951 |
| 2,603,902 | Stanwyck | July 22, 1952 |
| 2,861,380 | Peterson | Nov. 25, 1958 |